United States Patent [19]
Farina et al.

[11] Patent Number: 5,211,132
[45] Date of Patent: May 18, 1993

[54] APPARATUS FOR AUTOMATICALLY WASHING TEATS OF DAIRY ANIMALS

[75] Inventors: Felice Farina; Emilio Lucchini; Renato Federici, all of Cremona, Italy

[73] Assignee: Gilna Corporation N.V., Curacao, Netherlands Antilles

[21] Appl. No.: 886,019

[22] Filed: May 18, 1992

[30] Foreign Application Priority Data

May 20, 1991 [IT] Italy ................. 001377 A/91

[51] Int. Cl.⁵ ............................................ A01K 13/00
[52] U.S. Cl. ........................................ 119/158; 15/24; 15/22.1
[58] Field of Search ................. 119/158, 156, 14.18, 119/159; 15/23, 24, 22.1

[56] References Cited

U.S. PATENT DOCUMENTS

| 2,671,926 | 3/1954 | Minerley | 15/24 |
| 4,305,346 | 12/1981 | Sparr, Sr. | 119/158 |
| 4,538,315 | 9/1985 | Barth | 15/24 |
| 4,970,992 | 11/1990 | Aiken | 119/158 |

FOREIGN PATENT DOCUMENTS

| 0332235 | 9/1989 | European Pat. Off. | 119/156 |
| 2559351 | 8/1985 | France . | |

Primary Examiner—Gene Mancene
Assistant Examiner—Todd E. Manahan
Attorney, Agent, or Firm—Christensen, O'Connor, Johnson & Kindness

[57] ABSTRACT

An apparatus for automatically washing teats of generic dairy animals, specifically dairy cattle, comprises a box-type body formed with an opening for introducing a teat thereinto, and two pairs of counter-rotating brushes located at the opening in the box-type body and aligned along a direction of introduction of the teat into the box-type body.

3 Claims, 2 Drawing Sheets

APPARATUS FOR AUTOMATICALLY WASHING TEATS OF DAIRY ANIMALS

DESCRIPTION

This invention relates to an apparatus for automatically washing teats of generic dairy animals, specifically dairy cattle, comprising a box-type body having an opening for introducing a teat thereinto along a direction of introduction which is defined as the apparatus is applied to the teat to be washed, a first pair of rotary brushes rotating in opposite directions within the box-type body with their bristles slightly interleaved and applying a suction effect along the direction of introduction toward the body interior on the teat introduced through the opening.

Dairy animal, and especially cow, milking requires that the utmost cleanliness be maintained throughout the operation, for obvious reasons of sanitation and quality of the milk product.

Specifically, spores and incrustations of various description present on the teats of the animals, unless timely removed, may become a source of pathogenic germs and harmful bacteria affecting both human health and later processing of the milk.

In this respect, there exist strictly enforced standards and reference schedule which fix the quality, and hence the price, of milk in relation with its spore content.

Thus, there exists a need for thoroughly washing the teats of dairy animals prior to milking.

To fill this requirement, a first teat washing device is known from FR-A-2559351.

This device comprises a case wherein two rotary brushes are active which rotate counter-directionally about parallel axes and are located close to an outlet opening in the case.

The brushes have bristles which are slightly interleaved in an area adjacent to the opening, and the device also includes means for conveying washing liquids into said case.

However, such a device has less than adequately thorough washing capabilities; for operating the device, in fact, the case is brought close to the animal's udder to lead from above a teat into it through the opening, along a predetermined direction.

By rotating the brushes in a suitable direction, a suction is applied to the teat along the definite direction inwardly of the case as the teat contacts their bristles.

The teat inside the case is located between the brushes while the operator holds the device by a purposely provided handgrip and moves it to have the teat cleansed over its entire longitudinal extent.

However, this prior device action is ineffective on the teat tip and root regions, these being unreachable regions despite the movement imparted to the device by the operator during the washing operation.

Consequently to this, those spores which have not been removed by the washing device will be sufficient to contaminate the milk end product, thereby spoiling virtually the whole teat washing measure.

Also known in the pertinent art is a second device, disclosed in a European Patent Application laid open under serial No. EP 0399132-A1 and intended for dairy animal teat washing applications. This is basically similar to the above-outlined device.

In fact, this second device comprises a box-type housing provided with an opening, which is the like of the previously discussed case; inside the case two counter-rotating brushes are active similarly to the above-mentioned ones.

Additionally to those two brushes, a third brush is arranged within the box-type housing in succession along a lead-in direction for a teat to be washed. Located between the first two brushes and the third is a deflector roller revolvingly mounted on a pin.

The roller and third brush define a path transverse to said inlet direction, for the teat section which extends beyond the first two brushes with the device in operation.

While using the device, in fact, the latter is brought toward the udder of an animal and the teat introduced into the box-type housing through the purposely provided opening.

The first two brushes, being rotated in opposite directions, will create the suction effect mentioned above on the teat along the inlet direction toward the box-type housing interior, while the intervening roller will deflect the teat section extending downstream from these brushes in the aforesaid path.

This teat section then arranges itself substantially perpendicularly to said inlet direction to the box-type part and with the teat tip tangential of the third brush.

The latter being rotated in a suitable direction—that is at an opposite speed to the introduction of the teat section downstream from the first two brushes along the aforesaid path—it reportedly washes the tip region of the teat as well.

However, this does not happen, because that device has a drawback in that the action of the third brush pulls the teat out of its intended path, toward the deflector roller.

Thus, its operation will be ineffective due to the incorrect setting of the teat section which arranges itself between the roller and the third brush, thereby leading to failure of the designed teat end washing action of the third brush.

Additionally, the device of this example is also ineffective at the teat root region of attachment to the udder.

The underlying technical problem of this invention is to provide an apparatus for automatically washing teats of generic dairy animals, specifically dairy cattle, with such constructional and functional characteristics, as to overcome the drawbacks mentioned above and with which the prior art is beset.

This problem is solved according to the invention, by an apparatus as above indicated being characterized in that it comprises a second pair of rotary brushes rotating in opposite directions and being located downstream from said first pair along the direction of introduction of the teat into the box-type body, the second brush pair generating a thrust force in the opposite direction to the suction force generated by the first brush pair.

Further features and the advantages of the invention will become apparent from the description of an embodiment thereof, given by way of example and not of limitation with reference to the accompanying drawings.

DETAILED DESCRIPTION OF THE PREFERRED EMBODIMENTS

Figure 1:
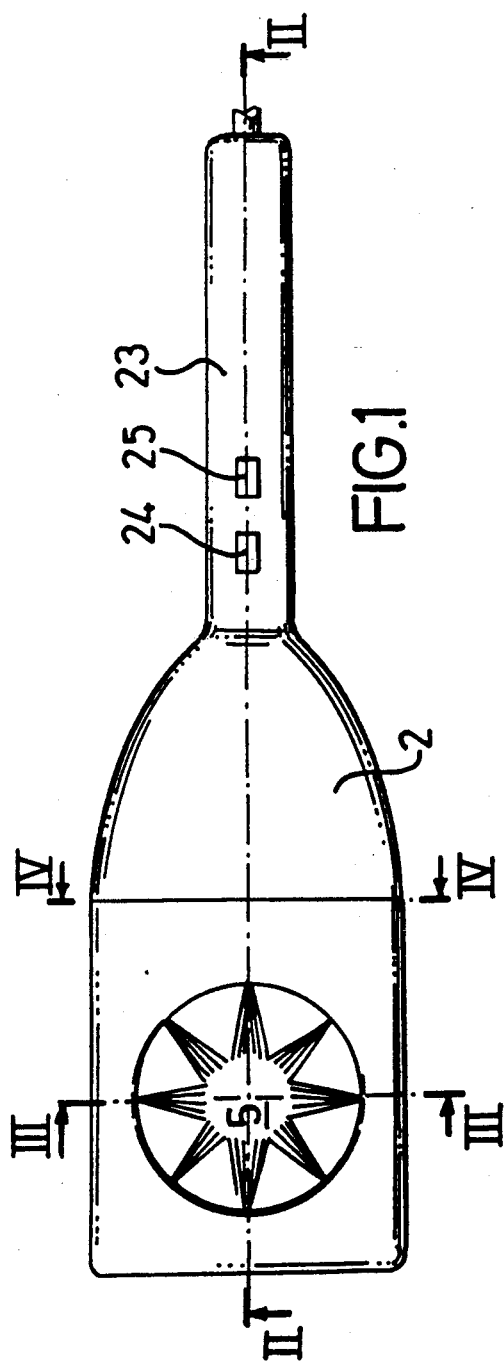
FIG. 1 is a plan view of an apparatus according to the invention.
Figure 2:
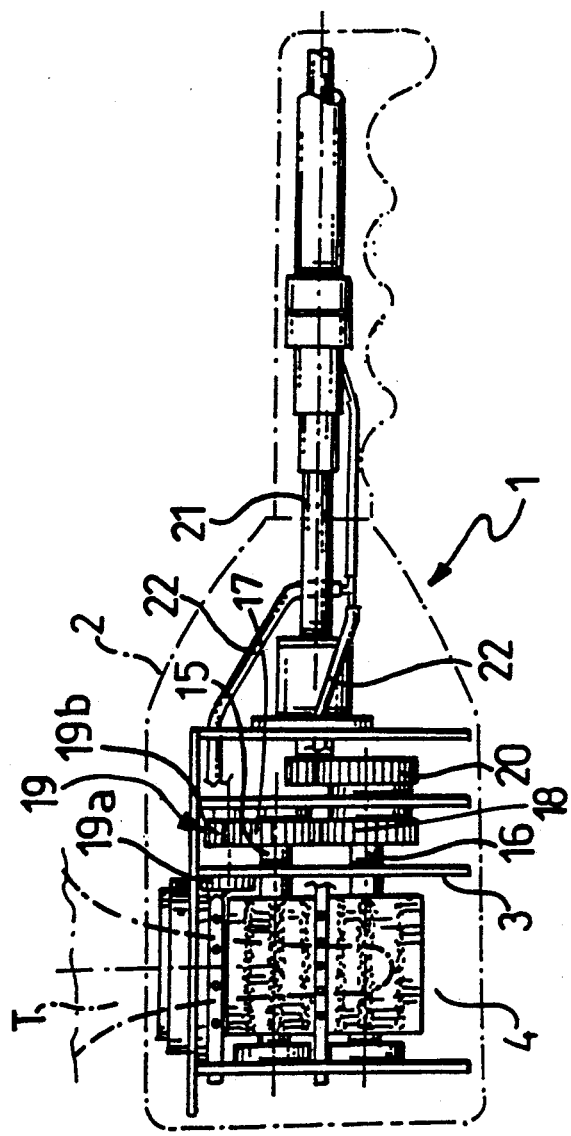
FIG. 2 is a sectional side view of the inventive apparatus according to the invention, taken along line II—II in FIG. 1.
Figure 3:
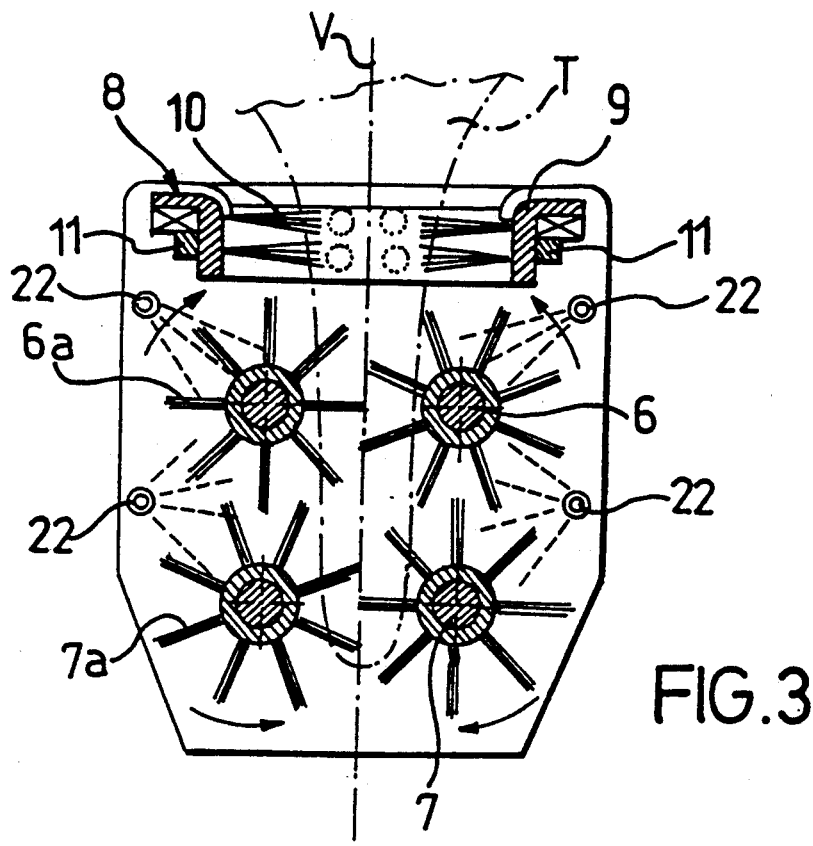
FIG. 3 is a sectional front view of the inventive apparatus according to the invention, taken along line III—III in FIG. 1.
Figure 4:
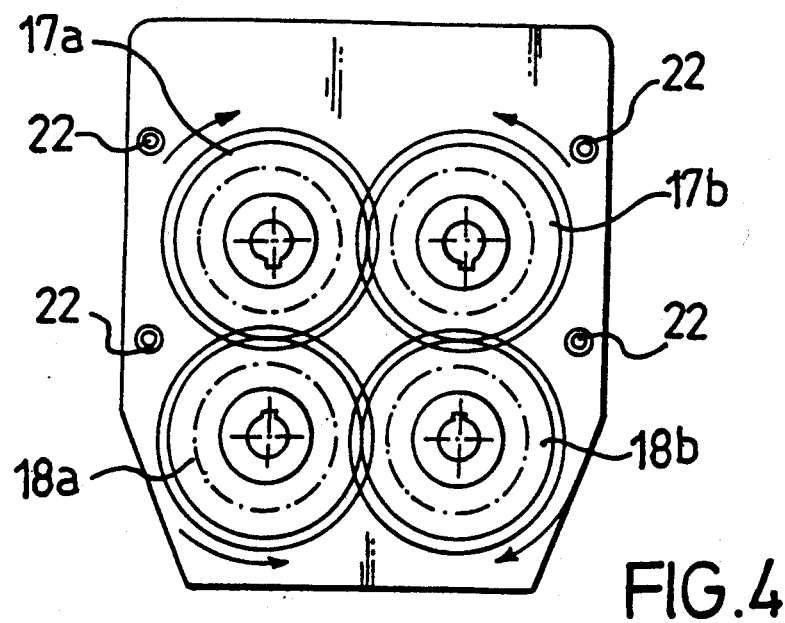
FIG. 4 is a sectional front view of the inventive apparatus taken along line IV—IV in FIG. 1.

With reference to the drawing figures, and particularly to FIGS. 2 and 3, a washing apparatus according to the invention is shown generally at 1 in a working position as applied to a teat T of an animal's udder.

Basically, it comprises a box-type body 2 wherein a transverse partition 3 defines a washing chamber 4.

The box-type body 2 is formed with an opening 5 for introducing the teat T into the washing chamber 4 along a direction of introduction V of the teat T from above into the box-type body 2.

Inside the washing chamber 4, there are active first and second pairs of counter-rotating brushes 6 and 7 in superimposed arrangement along the direction of introduction; both brush pairs have bristles 6a and 7a which are slightly interleaved along the direction V of introduction.

The brushes 6 are rotated in respective opposite directions to generate a suction effect toward the box-type body interior along said direction of introduction of the teat T.

The brushes 7 are rotated in respective opposite directions to generate a thrust effect in the opposite direction to said suction effect.

Also in the box-type body 2, a rotary brush 8 locates at the opening 5; this rotary brush 8 comprises a ring holder 9 coaxial with the rim of the inlet opening 5 to which bristles 10 are attached, extending radially toward the center of the opening 5 and leaving a passage for the teat.

The ring holder 9 is rotatingly mounted on the opening 5 and is provided with a ring gear 11.

The brush pairs 6 and 7 have respective stub shafts 15 and 16 which are passed through the transverse partition 3 and keyed to corresponding drive gears 17 and 18 such as through a spline connection.

The drive gears 17 and 18 are located, within the box-type body 2, outside the washing chamber 5.

Also passed through the transverse partition 3 is a pinion gear 19 enmeshed at a first end 19a thereof with the ring gear 11 within the washing chamber, and at a second end 19b with the drive gear 17.

In a preferred embodiment, the gears 17 and 18 are identical with each other, and the corresponding gear wheel pairs 17a, 17b and 18a, 18b are in mutual mesh engagement, respectively.

The gears 17 and 18 are also engaged, through an intermediate gear 20, drivingly with a conventional drive 21, such as a flexible drive cable.

The apparatus 1 further includes a means 22 of conveying washing liquids into the chamber 4 whose flow can be controlled manually as explained hereinafter.

The box-type body 2 has a handgrip 23 which juts out from the body and respectively carries a control pushbutton 24 for the drive 21 and a pushbutton 25 for controlling the flow of washing liquids into the chamber 4.

The apparatus of this invention as described above operates as follows.

An operator holds the apparatus 1 by the handgrip 23 and takes it to an animal's udder to introduce a teat T to be washed into the washing chamber 4 through the inlet opening 5.

By manipulating the control pushbutton 24, the drive 21 engaged drivingly with the gears 17 and 18 is operated, along with the brush pair 6 and 7 and the rotary brush 8.

The teat so introduced being urged forward between the brushes 6, is drawn by suction into the housing downstream therefrom along the direction of introduction to the brush pair 7.

With washing liquids being delivered to the chamber 4 interior, the combined action of all the brushes 6, 7 and 8 in the apparatus allows the whole extent of the teat to be affected for proper washing thereof.

In fact, the first brush pair 6, additionally to creating the suction effect toward the box-type body interior, will act longitudinally of the teat as in the prior art devices previously reviewed.

The brush pair 7 downstream from said first pair allow the free end of the teat to be reached because the thrust they generate is counteracted by the suction from the upper brushes 6 and applied symmetrically to the teat.

Thus, the latter is held stable inside the washing chamber under the balanced, symmetrically applied actions of the two brush pairs 6 and 7, which correctly perform their washing function on the teat free end as well.

At the same time, the rotary brush 8 located upstream of the two brush pairs 6 and 7, will clean the teat root area, thereby to complete the teat washing process in an easy and extremely rapid way.

An apparatus so constructed also enables the teat to be dried after the above-described washing operation.

In fact, through the pushbutton 25, the delivery of liquids into the washing chamber 4 can be cut off, and with the brushes kept rotating in a dry condition, a teat draining effect achieved along with removal of any contaminated residual liquid.

We claim:

1. An apparatus for automatically washing teats of generic dairy animals, comprising a box-type body having an opening for introducing a teat thereinto along a direction of introduction which is defined as the apparatus is applied to the teat to be washed, a first pair of rotary brushes rotating in opposite directions within the box-type body with their bristles slightly interleaved and applying a suction effect along said direction of introduction toward the box-type body interior on the teat introduced through the opening, and a second pair of rotary brushes rotating in opposite directions and being located downstream from said first pair along the direction of introduction, said second brush pair generating a thrust force in the opposite direction to the suction force from the first brush pair.

2. An apparatus according to claim 1, further comprising a ring-like rotary brush located upstream of said first and second brush pairs along the teat direction of introduction and coaxial with said opening for introducing the teat into the box-type body.

3. An apparatus according to claim 2, wherein said ring-like rotary brush comprises a ring-like holder rotatingly mounted on the rim of said opening of said body and to which bristles extending radially inwardly are affixed.

* * * * *